(No Model.)
W. HADDOCK.
PLATE OR DISH AND ADJUSTABLE COVER FOR THE SAME.
No. 373,801. Patented Nov. 22, 1887.
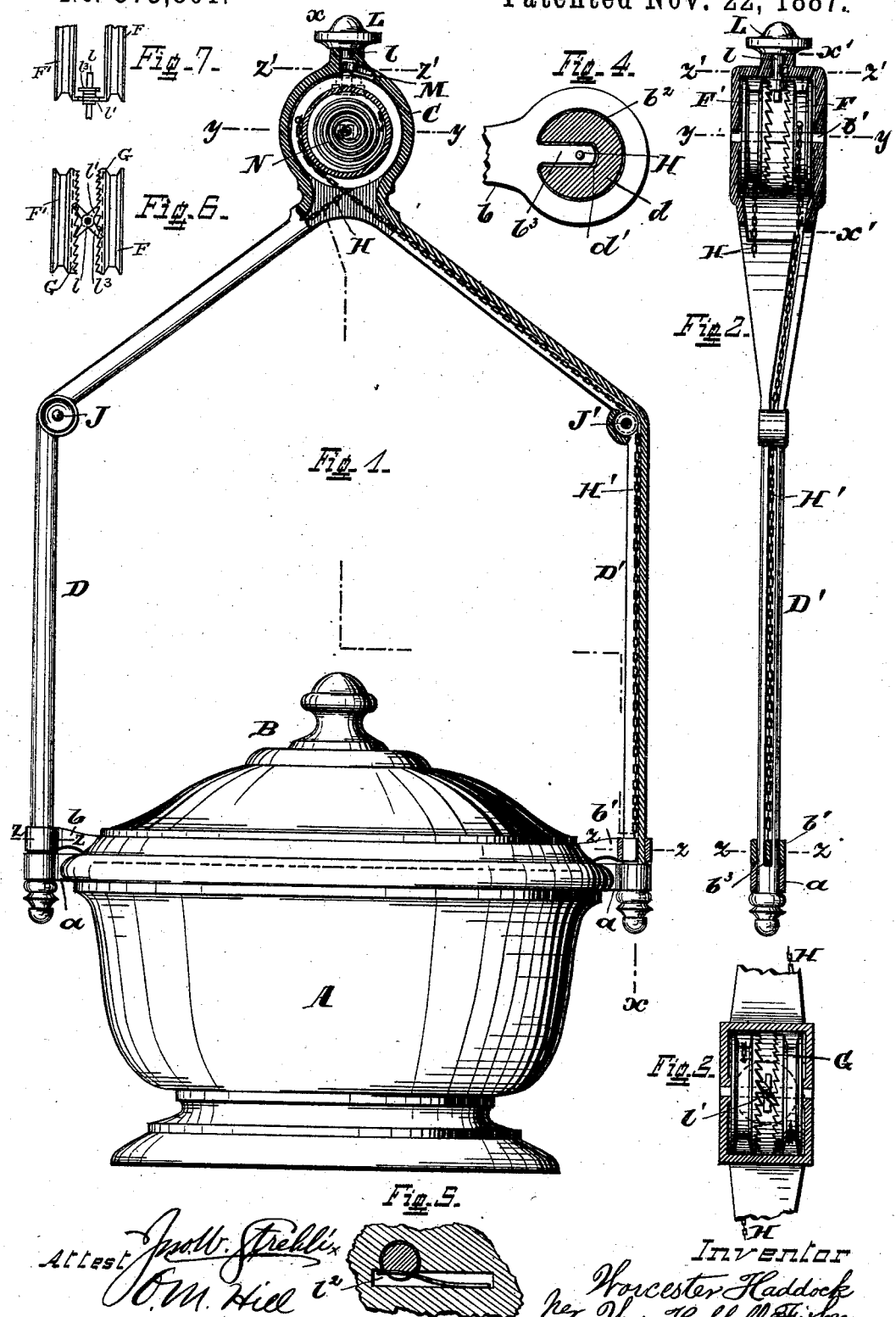

United States Patent Office.

WORCESTER HADDOCK, OF CINCINNATI, OHIO.

PLATE OR DISH AND ADJUSTABLE COVER FOR THE SAME.

SPECIFICATION forming part of Letters Patent No. 373,801, dated November 22, 1887.

Application filed March 2, 1885. Renewed April 9, 1887. Serial No. 234,267. (No model.)

*To all whom it may concern:*

Be it known that I, WORCESTER HADDOCK, of the city of Cincinnati, Hamilton county, and State of Ohio, have invented certain new and useful Improvements in Plates or Dishes and Adjustable Covers for the Same, of which the following is a specification.

The various features, objects, and advantages of my invention will be apparent from the following specification.

For the purposes of illustration I will now proceed to describe the application of my invention to a butter-dish, it being understood that I do not confine the application of my invention to such class of receptacles or vessels alone.

In the accompanying drawings, Figure 1 is a side elevation of a dish and attachments, one of the uprights and the top box or frame and the end of one arm of the cover being shown in section, the section being taken through the upright, just inside of the side thereof, till it reaches the box, and being then taken through the box at the line X X of Fig. 3. Fig. 2 is a vertical sectional elevation through the line Y Y of Fig. 1. Fig. 3 shows a top view of the drums and pawl, all of the pawl-stem above the pawl being removed, and also showing a sectional view of the box, said section being taken at the line Y Y of Fig. 1. Fig. 4 is a cross-section showing the relation of the arms of the lid or cover of the dish to the uprights, said section being taken at the line Z Z of Fig. 1. Fig. 5 is a cross-section taken at the line Z' Z' of Fig. 1, and showing the flattened surface of the pawl-stem and its spring. Fig. 6 shows a top view of the drums and pawl and brake, the greater part of the pawl-stem above the pawl being removed. Fig. 7 is a side elevation of the device shown in Fig. 6, except that the upper portion of the drums is broken off.

The dish or receptacle A may be made of any desired shape and material, but is preferably circular in outline. It is provided with a rim, $a$, extending around its edge; or, in place of the rim, two arms, $a\ a$, may be made to project from points diametrically opposite each other. The cover or lid, of such design as may be appropriate, fits onto the dish proper, preferably into a groove or channel. Two uprights, D and D', rise vertically from the arms $a\ a$, and after reaching a certain height they approach each other and unite at the box or frame C.

The uprights D D' are slotted or grooved out, preferably on the inside, so as to make the groove $d$. This is shown in Fig. 4. Above the bend these uprights are gradually broadened as they approach the box C, and in each one the channel $d$ bifurcates, as shown in Fig. 2. In each upright, at the point where it is bent, is placed a small pulley, J J', which is pivoted in the sides of the upright and turns in the groove $d$. The lid B is provided with two arms, $b$ and $b'$, each of which carries a tongue, $b^3$, which projects into the groove $d$, as shown in Fig. 4. Each arm $a$ is also preferably provided with an eye or ring, $b^2$, surrounding the adjacent upright, and the tongue $b^3$ may in such event be connected to the ring.

The box or frame C is preferably cylindrical in form, and corresponding to its axis it has passing through it an axle or pivot, C'. Two pulleys or barrels, F F', turn loosely on the fixed or stationary axle C'. Each barrel has in it a spring, N, which is attached to the barrel and to the axle, and imparts or tends to impart motion to the barrel in the same manner as the mainspring of a watch imparts motion to its barrel. The springs are arranged so as to turn the barrels in opposite directions. Two light chains or cords, H H', are attached, one on either side, to the tongue $b^3$, and carried up through the channels $d$, over the pulleys J J', and are attached, the one to barrel F, the other to barrel F'.

The preferred means for controlling the action of the springs and for causing the cover as it is drawn down to remain at any desired point of elevation in relation to the dish are as follows: The adjacent flat face of each barrel is provided with a ratchet work or teeth, G, so arranged that a pawl entering said ratchet prevents the barrel from turning, and hence prevents the action of the spring in the barrel. Instead of a single pawl, a double pawl is preferably employed, connected and constructed as follows: The thumb-piece L has a stem, $l$, which projects into the box C, and has on its extremity the double pawl $l'$. In the position shown in Fig. 3 this pawl acts as a stop to both barrels; but turned so as to occupy the space between the barrels, it allows both barrels to turn through the action of their said springs. A spring, M, is set in the box C and bears against a flat surface, $l^2$, on the stem $l$. (See Fig. 5.) This always insures holding the pawl in such position as to keep the barrels motionless whenever the pawl is not kept from engaging with the ratchets through human agency. When the lid B is in the dish A the springs are coiled up. If, now, the thumb-piece L be turned slightly, so as to disengage the pawl $l'$ from the ratchets, the springs N will uncoil, turn the barrels F F', and wind up the chains on them, and in this way the lid B will be raised. As soon as the piece L is loosed the pawl flies into position and stops the motion of the barrels. The lid is pulled down by hand.

Should it be found that the lid has a tendency to rise too fast when the pawl is disengaged from the ratchet, a suitable brake may be provided, a preferred form of same being the brake $l^3$, rigidly fixed to the stem $l$, directly below the pawl. When the stem $l$ is turned and the pawl disengaged from the ratchets, the stem is rotated a little more in the same direction, and this movement brings the ends of the brake against the sides of the barrel, and by its friction retards the too rapid rotation of the barrels in raising the lid. Instead of two barrels and springs, obviously one barrel and spring might be used to wind up the chains or cords; but I prefer to employ two barrels and their springs.

The article can be made into a handsome table ornament, and is useful and convenient. It obviates the necessity of removing the lid and placing it on the table-cloth, exposing the latter to soiling. In summer it is especially convenient, as the lid is so readily removed and replaced. While the various features of my invention are preferably employed together, one or more of said features may be employed without the remainder. In so far as applicable, one or more of said features may be employed in connection with dishes other than that herein specifically described.

What I claim as new and of my invention, and desire to secure by Letters Patent, is—

1. In a dish, the combination of barrels F F' and a suitable brake and mechanism, substantially as described, for operating said barrels, substantially as and for the purposes specified.

2. The combination of dish, the lid, uprights D D', frame or box C, barrels F F', turning in opposite directions, springs N, and chains H H', substantially as and for the purposes specified.

3. The dish A, provided with lid B, in combination with uprights D D', box C, barrels F F', springs N, chains H H', and thumb-piece L, substantially as and for the purposes specified.

4. The dish and lid and uprights, frame C, springs N, barrels F F', having ratchet-work G, chains H H', double pawl $l'$, and thumb-piece L, substantially as and for the purposes specified.

5. The dish and lid and uprights, frame C, springs N, barrels F F', with ratchet-work, chains H H', pawl $l'$, thumb-piece L, having flattened stem $l$, and spring M, substantially as and for the purposes specified.

6. The barrels F F', rotating in opposite directions, and the springs, chains H H', and uprights, and cover having arms $b\ b'$, substantially as and for the purposes specified.

7. The combination of the springs, barrels F F', chains, cover, dish, pawl $l'$, brake $l^3$, and thumb-piece L, substantially as and for the purposes specified.

WORCESTER HADDOCK.

Witnesses:
LEONARD SMITH,
JNO. W. STREHLI.